(No Model.)

B. F. CARSON.
CHURN DASHER.

No. 424,669.  Patented Apr. 1, 1890.

WITNESSES:
F. McArdle.
C. Sedgwick

INVENTOR:
B. F. Carson
BY Munn & Co.
ATTORNEYS.

UNITED STATES PATENT OFFICE.

BENJAMIN F. CARSON, OF NASHVILLE, TENNESSEE.

CHURN-DASHER.

SPECIFICATION forming part of Letters Patent No. 424,669, dated April 1, 1890.

Application filed September 4, 1889. Serial No. 322,983. (No model.)

*To all whom it may concern:*

Be it known that I, BENJAMIN F. CARSON, of Nashville, in the county of Davidson and State of Tennessee, have invented a new and Improved Churn-Dasher, of which the following is a full, clear, and exact description.

The object of the invention is to provide a new and improved churn-dasher, which is simple and durable in construction, very effective in operation, and avoids the breaking of the butter globules, so that butter of fine quality is produced.

The invention consists of a rounded-off pear-shaped center piece and a series of rounded knobs projecting from the said center piece and arranged in a circle on the same.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in both figures.

Figure 1:
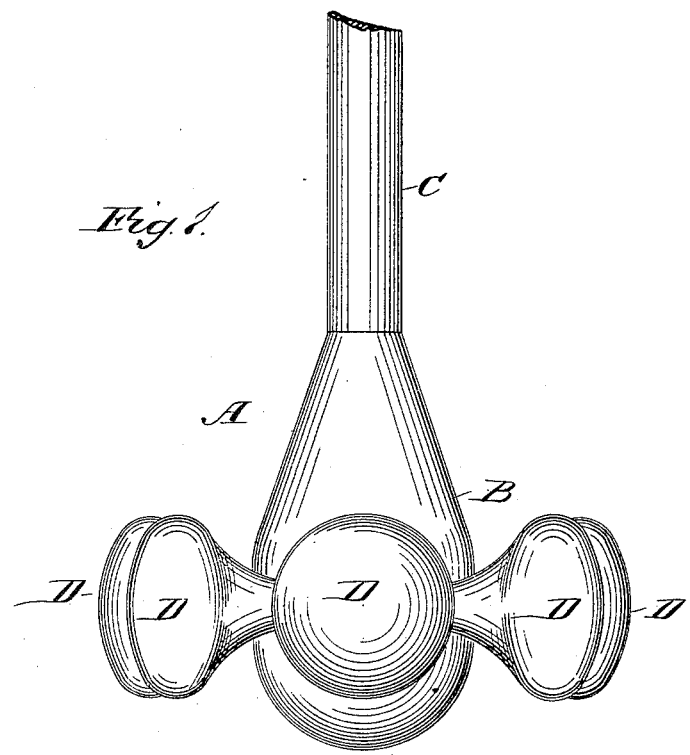
Figure 2:
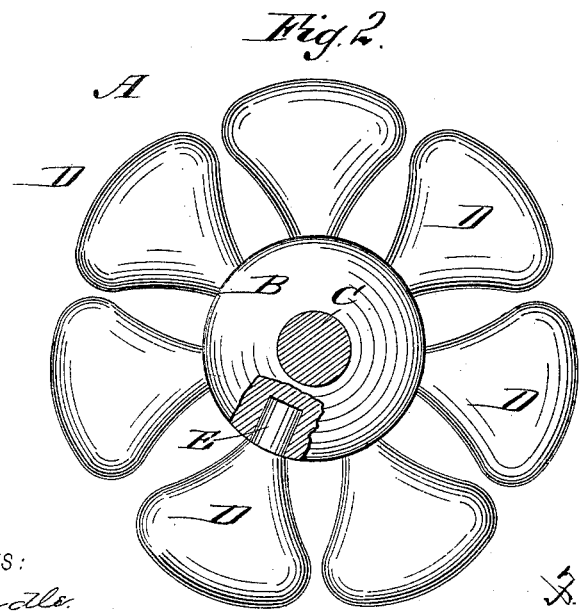

Figure 1 is a side elevation of the improvement, and Fig. 2 is a plan view of the same with parts in section.

The improved churn-dasher A is provided with a pear-shaped center piece B, connected at its upper end with the handle C. The center piece is circular and rounded off on all sides, as is plainly shown in the drawings, so as to present no sharp corners to the milk in which it operates. On the center piece B are secured a number of knobs D, arranged in a circle and projecting radially from the said center piece B, as is plainly shown in Figs. 1 and 2. The knobs D are each rounded off on all sides, and preferably narrow toward the inner end, which is provided with a pin E, fitting into a corresponding aperture in the center piece B, and fastened therein by glue or other suitable means. It will be seen that a churn-dasher constructed in this manner, when set in motion in milk in the usual way, presents no sharp corners whatever to the milk, and consequently the butter globules contained in the milk are not broken, so that a better quality of butter is produced. When the churn-dasher presents sharp corners to the milk, the butter globules are broken and the butter produced will have a greasy taste. It will further be seen that the churn-dasher, in its up-and-down motion in the milk, agitates the latter freely, as part of the milk can pass between the several knobs D in their up-and-down motion.

Having thus fully described my invention, I claim as new and desire to procure by Letters Patent—

1. A churn-dasher comprising a rounded-off center piece and a series of knobs projecting from the said center piece and arranged in a circle on the same, substantially as shown and described.

2. A churn-dasher comprising a pear-shaped center piece, a handle secured on the said center piece, and a series of rounded knobs projecting from the said center piece and arranged in a circle on the same, substantially as shown and described.

BENJAMIN F. CARSON.

Witnesses:
 J. TH. PUCKETT,
 MURREY TUCKER.